United States Patent Office 3,414,377
Patented Dec. 3, 1968

3,414,377
PRODUCTION OF CHLORINE
Robert Bauwens, Colombes, and Jean Molliere, Huninge, France, assignors, by mesne assignments, to Ugine Kuhlmann (societe anonyme), Paris, France, a corporation of France
No Drawing. Filed Jan. 4, 1966, Ser. No. 518,555
Claims priority, application France, Jan. 7, 1965, 1,152
8 Claims. (Cl. 23—167)

ABSTRACT OF THE DISCLOSURE

Process for producing chlorine from hydrogen chloride, wherein mixtures of hydrogen chloride, sulphur dioxide, and possibly sulphur trioxide oxygen containing gases are treated in the presence of a catalyst, thus making it possible to produce chlorine and sulphuric acid in one and the same operation.

Prior art

It is known that hydrogen chloride constitutes an important byproduct of numerous manufacturing processes utilising chlorine or chlorine compounds. At the present time, chlorine is required in regularly increasing quantities, so that the recovery of chlorine from hydrogen chloride becomes desirable, if it can be effected economically. It should be noted that the production of chlorine from hydrogen chloride also provides a solution to the problem of the elimination of residual quantities of hydrochloric acid produced in certain manufacturing processes.

For the production of chlorine it is known to oxidize hydrogen chloride on a copper-based catalyst (Deacon and derived processes). Numerous other processes have been studied, for some of which the use of inorganic oxidising agents is particularly recommended.

In particular, it is known to utilise sulphur trioxide as an oxidizing agent for converting hydrogen chloride into chlorine. The action of sulphur trioxide on hydrogen chloride may be summarised by the three following equations:

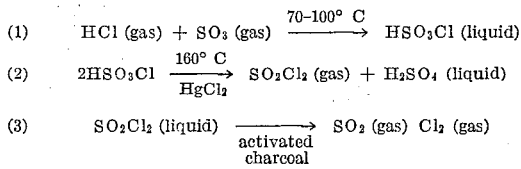

In practice these three reactions must be conducted separately, because while reactions (1) and (3) are rapid, reaction (2) must be carried out under pressure in the liquid phase in order to attain sufficient velocity. It is therefore difficult to carry it out continuously and to separate the catalyst from the sulphuric acid formed. Moreover, the chlorine produced is mixed with an equal volume of sulphur dioxide and the separation of these two gases is difficult.

Object of the invention

The invention has an object a process of oxidizing hydrogen chloride which makes it possible for liquid sulphuric acid and gaseous chlorine to be obtained in a single stage in accordance with the equation:

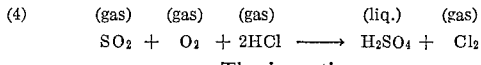

The invention

The process of the invention for obtaining chlorine and sulphuric acid from hydrogen chloride and sulphur dioxide consists fundamentally in bringing a gaseous starting mixture, comprising essentially of sulphur dioxide, oxygen, or a gas containing oxygen, and hydrogen chloride, the sulphur dioxide being in slight stoichiometric excess, into contact with a catlytic mass of an inert support containing essentially vanadium compounds and alkali or alkaline earth metal compound promoters, in order to obtain a mixture of gaseous chlorine, liquid sulphuric acid, sulphur trioxide, and chlorosulphonic acid, as an intermediate, as well as a small quantity of unreacted sulphur dioxide, after which the chlorosulphonic acid is condensed and the sulphur trioxide is absorbed in sulphuric acid in order to collect separately the sulphuric acid and the desired gaseous chlorine.

The invention takes advantage of the known fact that it is possible to convert a gaseous mixture of sulphur dioxide and oxygen with or without a certain quantity of nitrogen into sulphur trioxide by passing over a vanadium contact mass.

In the process of the invention the operating conditions utilised are those for which the conversion of sulphur dioxide into sulphur trioxide is optimum.

The catalysts used consist of an inert support such as silica, alumina, or a silico-aluminate, containing vanadium compounds and alkali or alkaline earth metal compound promoters.

The vanadium content, expressed as a percentage by weight of $V_2O_5$, may vary from 3% to 15%.

The alkali content, expressed as $K_2O$, is between 5 and 20%. The oxides $Na_2O$, $Cs_2O$, and $Rb_2O$ may also be used as promoters.

Moreover, other metals (Ag, Cu, W, Mn, Fe, Cr, Zn, Cd), may be present in larger or smaller quantities, while the main constituent remains vanadium.

The catalyst utilised in the process of the invention may be in the form of a fixed layer or a fluidised bed.

It is preferable to utilise determinate proportions of the starting gases, sulphur dioxide and hydrogen chloride. If in fact the hydrogen chloride is in excess over the theoretical quantity expressed by reaction (4), it is found that the vanadium contained in the catalyst reacts with it to form an oxychloride which is volatile under the reaction conditions.

On the other hand, if the quantity of sulphur dioxide present is sufficient, that is to say in slight stoichiometric excess, the formation of halogenated compounds of vanadium does not occur and the catalyst remains unchanged.

At normal pressure the temperature of the catalytic mass must be between 400 and 600° C. In order to control the temperature it is possible to make use of the usual techniques of cooling utilised in sulphuric acid contact installations. Thus it is possible to utilise exchangers inside or outside the catalysis zone, or injections of volumes of cold gas constituted by the gases participating in the reaction or by air may be effected.

It may in particular be advantageous to introduce the hydrogen chloride through the catalytic mass, if the latter is disposed in a fixed bed.

The process of the invention may preferably be carried out at atmospheric pressure, but use may likewise be made of lower or higher pressures, particularly of pressures ranging from over 1 to about 10 atmospheres.

Under the conditions of operation which have just been described, the contact times for the gaseous starting mixture on the catalytic mass are advantageously between 1 and 20 seconds. In the present description the contact time will be defined as the ratio of the volume of catalyst to the volume of gas, measured at normal temperature and pressure, passing per unit of time through the volume assumed to be empty of catalyst. The prefered contact times are of the order of 3 to 10 seconds. Thus for a contact time of the gases on the catalyst of the order of 4 seconds, a proportion of 75 to 80% of hydrogen chloride utilised at the start is converted into chlorine, the residual quantity, namely from 25 to 20%, being converted into chlorosulphonic acid.

According to an improved alternative form of the process of the invention, the chlorosulphonic acid separated by condensation is treated with water in order to regenerate the hydrogen chloride according to reaction (5).

$$HSO_3Cl + H_2O \rightarrow H_2SO_4 \text{ (liquid)} + HCl \text{ (gas)} \quad (5)$$

It is then easily possible to recycle the hydrogen chloride thus recovered into the initial gas-stream before catalysis. The process of the invention thus makes it possible to obtain yields of chlorine and sulphuric acid higher than 95% referred to hydrogen chloride and sulphur dioxide.

In order to improve the yield still further, it is likewise possible to utilise in the initial gaseous mixture, instead of air, either pure oxygen or oxygen enriched air.

It should also be noted that the introduction of HCl may take place between certain layers of catalyst when said catalyst is arranged in fixed beds; the conversion of sulphur dioxide into sulphur trioxide may therefore be carried out entirely or in part before the introduction of HCl and may even be carried out in an auxiliary converter.

It is, moreover, known that sulphur trioxide possesses the particular property of fixing hydrogen chloride at low temperature. This phenomenon may be utilised to treat the gases supplied by a chlorine production process of the Deacon type. Under these conditions the addition of sulphur trioxide to the gases leaving the Deacon process makes it possible to fix the water in the form of sulphuric acid and to fix the residual hydrogen chloride in the form of chlorosulphonic acid. The two products thus formed, sulphuric acid and chlorosulphonic acid, are liquid under the conditions of the reaction and may easily be separated from the gas stream containing the chlorine formed. It is then possible to regenerate hydrogen chloride from chlorosulphonic acid by treatment with water, after which the hydrogen chloride thus recovered is recycled to the reactor. There is thus no need to wash the gases obtained by a Deacon process with water, the object of which washing was to recover the unreacted hydrogen chloride with a view to regenerating anhydrous HCl for purposes of recycling thereof. This washing was followed by dehydration by means of sulphuric acid, which degraded considerable quantities of this acid.

The process of the invention is advantageously carried out continuously. Automatic means may be provided for checking the $SO_2$ and HCl content of the initial gaseous mixture, and of the chlorine content of the converted gases. Thus it is possible to effect rapid gas-liquid chromatographic analysis of samples of gas taken automatically at regular intervals of time from the gases before and after conversion.

The invention is illustrated without being in any way limited by the following examples:

Example 1

The following gaseous mixture was used:

10 litres/hour $SO_2$ (0.457 mol gram/hour)
15 litres/hour HCl (0.647 mol gram/hour)
90 litres/hour air (0.844 mol gram/hour oxygen)
(3.17 mol gram/hour nitrogen)

and passed into a Pyrex glass reactor containing 75 grams (i.e. 100 ml.) of a catalyst comprising 7.5% vanadium pentoxide, 11.5% potassium oxide and 24% $SO_3$, by weight, on amorphous silica. The contact time under these conditions was about 3 seconds.

The reactor was placed in the isothermal zone of a furnace; downstream of the reactor were disposed a condenser, cooled to ambient temperature, and an absorber flask filled with 98% sulphuric acid.

The gaseous mixture was analysed by gas-liquid chromatography before entering the reactor and after leaving the absorber.

The introduction of the gas to be analyzed into the carrier gas circuit of the chromatographic column was effected by a special admission tap enabling a reproducible volume of gas to be tapped. The carrier gas was nitrogen.

The column, the filling of which was specially designed to make rapid analysis, was constituted by the following stationary phase:

Trichlorobenzene—12 parts by weight
Crystallised silica support (specific surface of the order of 0.9 square metres per gram, not retaining HCl): 88 parts.

This stationary phase, which must be perfectly anhydrous, constituted a column of a length of 2 metres.

The mean speed of passage of the carrier gas was 4 cm. per sec.

The times for the appearance of the different components were as follows:

```
                                                    Seconds
O_2 ------------------------------------------------- 50
HCl ------------------------------------------------- 70
SO_2 ------------------------------------------------ 105
Cl_2 ------------------------------------------------ 150
```

Complete analysis of the gaseous mixture was therefore possible in three minutes. The concentrations of the gas to be analyzed were proportional to the height of the chromatographic peaks, as was shown by the previous calibration of the apparatus.

The catalyst was brought to different temperatures and maintained for sufficient time for the system to attain equilibrium, and every four minutes a chromatographic analysis of the outgoing gases was made.

The condensation of a liquid in the empty condenser at the outlet of the furnace was also noted.

The results for a contact time of 3 seconds are summarised in Table I below.

TABLE I

| | Upstream of catalysis furnace | Downstream of catalysis and absorber furnace | | | |
|---|---|---|---|---|---|
| | | 450° C. | 480° C. | 500° C. | 510° C. |
| SO_2: | | | | | |
| Percent | 8.6 | 0.28 | 0.32 | 0.34 | 0.35 |
| G.-mol/h | 0.457 | 0.013 | 0.015 | 0.0155 | 0.016 |
| HCl: | | | | | |
| Percent | 12.9 | | traces | <0.1 | |
| G.-mol/h | 0.674 | | | | |
| Cl_2: | | | | | |
| Percent | | 6.1 | 6.6 | 6.4 | 6.3 |
| G.-mol/h | | 0.243 | 0.266 | 0.256 | 0.252 |
| Yield referred to initial HCl, percent | | 72 | 78.9 | 76.1 | 74.6 |
| Referred to SO_2, percent | | 97.2 | 96.8 | 96.6 | 96.5 |

It should be noted that hydrogen chloride is no longer found in the outgoing gases; the hydrogen chloride which has not been converted into chlorine is in fact to be found in the form of condensed chlorosulphonic acid; chemical analysis of the condensate downstream of the catalysis furnace corresponded to an acid the density of which varied from 1.78 to 1.80 and which contained the major part of unreacted hydrogen chloride in the form of chlorosulphonic acid and a part of the sulphuric acid formed by reaction:

$$SO_2 + O_2 + 2HCl \rightarrow H_2SO_4 + Cl_2 \quad (4)$$

Part of this acid condensed with chlorosulphonic acid, the other part being retained in the absorber.

Example 2

The initial gaseous mixture was identical with that of Example 1, but the apparatus was supplemented by a device for condensing more effectively the chlorosulphonic acid formed and adding to this liquid a suitable quantity of water (4 to 5 grams per hour under the conditions of the experiment). The initial air, to which was added, in the from of steam, the water required for decomposition of $HSO_3Ca$, by the air, passed through a filling the top part of which was sprinkled with the condensate. The hydrogen chloride resulting from the decomposition of $HSO_3Cl$ was carried off by the air current to which were subsequently added the initial flows of (10 litres per hour) and hydrogen chloride (15 litres per hour).

The analyzes were made under the same conditions as for the previous example (by gas-liquid chromatography).

Concentrated sulphuric acid (96–97%) was withdrawn at the bottom of the chlorosulphonic acid decomposition column; this acid contained practically no hydrogen chloride (content lower than 0.1%).

With regard to the conversion of hydrogen chloride into chlorine, the results shown in Table II were obtained, for a contact time slightly less than 3 seconds, the analysis of the gaseous mixture before the reaction showing that about 20–30% of the initial HCl is recycled:

TABLE II

|  | Upstream of catalysis furnace | Downstream of catalysis furnace $HSO_3Cl$ decomposition and absorber | |
|---|---|---|---|
|  |  | 460° C. | 480° C. |
| $SO_2$: |  |  |  |
| Percent volume | 8.6 | 0.38 | 0.44 |
| G.-mol/h | 0.457 | 0.0162 | 0.018 |
| HCl: |  |  |  |
| Percent volume | 12.9 | (*) | (*) |
| G.-mol/h | 0.674 | (*) | (*) |
| Chlorine: |  |  |  |
| Percent volume |  | 8 | 8.2 |
| G.-mol/h |  | 0.32 | 0.326 |
| Yield: |  |  |  |
| Percent HCl |  | 94.9 | 96.8 |
| Percent $SO_2$ |  | 94.5 | 94 |

*Undeterminable.

It was moreover found that the unconverted hydrogen chloride was not contained entirely in the acid withdrawn by the device in which the decomposition of chlorosulphonic acid was effected and part of the said acid is in fact not condensed and is retained with the sulphur trioxide in the absorber.

What we claim is:

1. A process for producing chlorine and sulphuric acid from hydrogen chloride and sulphur dioxide comprising the steps of circulating a gaseous starting mixture, comprising essentially sulphur dioxide, a gas containing oxygen, and hydrogen chloride, the concentration of sulphur dioxide in said mixture being slightly over 1 mole per mole of hydrogen chloride, through a catalytic reaction zone at a temperature of 400 to 600° C. and containing a catalytic mass formed essentially of an inert support and vanadium compounds and promoters selected from the group consisting of alkali metals and alkali metal oxides whereby a mixture of gaseous chlorine, liquid sulphuric acid, sulphur trioxide and chlorosulphonic acid, as well as a small quantity of unreacted sulphur dioxide is obtained, issuing from said reaction zone condensing said sulphuric acid and chlorosulphonic acid from said issuing mixture, separating by further condensation said sulphuric acid from said chlorosulphonic acid, absorbing said sulphur trioxide in liquid sulphuric acid and separately collecting said gaseous chlorine.

2. A process as claimed in claim 1, in which the vanadium content of the catalyst, expressed as weight of $V_2O_5$, is from 3 to 15%.

3. A process as claimed in claim 1, in which the promoter in the catalyst is an alkali metal oxide and the content of said promoter is between 5 and 20% by weight of the catalyst.

4. A process as claimed in claim 1, in which the gaseous mixture in the reaction zone is maintained at a pressure of ranging from 1 to 10 atmospheres.

5. A process as claimed in claim 1, in which initial gaseous mixture is contacted with the catalyst during a period of time ranging from 1 to 20 seconds.

6. A process according to claim 1, in which the oxygen containing gas is pure oxygen.

7. A process as claimed in claim 1, in which part of said sulphur dioxide contained in said starting mixture is converted to sulphur trioxide before said mixture is passed through the reaction zone.

8. A process as claimed in claim 1, in which said separated chlorosulphonic acid is treated with water whereby liquid sulphuric acid and gaseous hydrogen chloride are obtained, said gaseous hydrogen chloride being thereafter separated from said liquid sulphuric acid and returned to the gaseous starting mixture.

References Cited

UNITED STATES PATENTS

| 3,152,866 | 10/1964 | Kamlet | 23—167 |
| 3,275,406 | 9/1966 | Krempff | 23—175 |

EARL C. THOMAS, *Primary Examiner.*

A. GREIF, *Assistant Examiner.*